(12) United States Patent
Martin

(10) Patent No.: US 7,089,206 B2
(45) Date of Patent: Aug. 8, 2006

(54) TRADE ALLOCATION

(75) Inventor: William Martin, Chicago, IL (US)

(73) Assignee: UBS AG, Zurich (CH)

(*) Notice: Subject to any disclaimer, the term of this patent is extended or adjusted under 35 U.S.C. 154(b) by 879 days.

(21) Appl. No.: 09/891,945

(22) Filed: Jun. 26, 2001

(65) Prior Publication Data

US 2003/0110113 A1 Jun. 12, 2003

Related U.S. Application Data

(60) Provisional application No. 60/215,158, filed on Jun. 30, 2000.

(51) Int. Cl.
*G06F 17/60* (2006.01)

(52) U.S. Cl. .......................................... 705/37; 705/30

(58) Field of Classification Search ............. 705/30–42
See application file for complete search history.

(56) References Cited

U.S. PATENT DOCUMENTS

| | | | | |
|---|---|---|---|---|
| 6,021,397 | A * | 2/2000 | Jones et al. ................... | 705/36 |
| 6,078,904 | A * | 6/2000 | Rebane ......................... | 705/36 |
| 6,154,732 | A | 11/2000 | Tarbox ......................... | 705/36 |
| 6,249,775 | B1 | 6/2001 | Freeman et al. ............... | 705/36 |
| 6,317,728 | B1 | 11/2001 | Kane ........................... | 705/37 |
| 6,324,523 | B1 | 11/2001 | Killeen, Jr. et al. ........... | 705/35 |

FOREIGN PATENT DOCUMENTS

WO WO 98/41942 * 9/1998

OTHER PUBLICATIONS

Maes et al., "Agents that buy and sell", Communications of the ACM, v42n3, pp. 81-87, Mar. 1999, ISSN: 0001-0782, Dialog file 15, Accession No. 01784422.*
International Search Report for PCT/US01/20693 dated Jan. 3, 2002.

* cited by examiner

*Primary Examiner*—Frantzy Poinvil
(74) *Attorney, Agent, or Firm*—Proskauer Rose LLP

(57) ABSTRACT

A trade allocation system includes a computer system having a network interface over which messages can be exchanged with an order management system. The computer system is also coupled to a first database that stores data associating portfolios with risk classes and target ratios. A second database stores instructions to configure the system to receive from order management systems messages describing trades of financial instruments. Each message can include a financial instrument identifier, a size of the trade, and a risk class identifier. The instructions also configure the processor to query the first database to determining a portfolios that are associated with a risk class identified by a risk class identifier in a message as well as to determine a target ratio for each of the portfolios. The processor then allocates the trade of the financial instrument among each of the portfolios based on the target ratios. Allocating a trade of a financial instruments among a group of portfolios include receiving a message descriptive of a trade of a financial instrument. The message can include a financial instrument identifier and a size of the trade. A collection of portfolios are then identified based on a match between a risk class of the portfolio and the risk class of the traded financial instrument. The trade is then allocated among each of the portfolios based on a target ratio associated with each portfolio.

19 Claims, 2 Drawing Sheets

TRADE ALLOCATION

This application claims the benefit of the filing date of U.S. provisional application Ser. No. 60/215,158 entitled "Trade Allocation" which was filed on Jun. 30, 2000.

BACKGROUND OF THE INVENTION

In stock trading and other financial instrument trading markets, a trader may buy and sell instruments on behalf of a number of different clients and/or investment portfolios. When a trader transacts a trade, the number of instruments traded may not satisfy an outstanding trading demand for the clients or portfolios. In such a situation, there may be a need to allocate the instruments that are traded among the waiting clients or portfolios. Manual allocation of a trade can be a complex and time consuming process. Consequently, computer automated allocation of a trade is desirable. One solution to allocating a traded instrument is to include functionality in an Order Management System (OMS) to perform trade allocation. However, in existing OMSs, trade allocation features may be lacking or inadequate. One solution to this problem is to modify OMS software to add desired allocation features. As a practical matter, such modification may not be feasible. For example, software code for an OMS may be under control of a vendor and not modifiable, or a trading network may include a variety of different OMSs and, due to cost or other concerns, modification of each of the OMSs may not be possible. Consequently, non-OMS based trade allocation solutions are desirable.

SUMMARY OF THE INVENTION

In general, in one aspect, the invention features a computer-implemented method of allocating a trade of a financial instruments among a group of portfolios. The method includes receiving a message descriptive of a trade of a financial instrument. The message can include a financial instrument identifier and a size of the trade. A collection of portfolios are then identified based on a match between risk classes associated with the portfolios and the risk class of the traded financial instrument. The trade is then allocated among each of the portfolios based on a target ratio associated with each portfolio.

In general, in another aspect, the invention features a trade allocation system that includes a computer system having a network interface over which messages can be exchanged with an order management system. The computer system is also coupled to a first database that stores data associating portfolios with risk classes and target ratios. A second database stores instructions to configure the system to receive messages from order management systems. Each message can include a financial instrument identifier, a size of the trade, and a risk class identifier. The instructions also configure the processor to query the first database to determining portfolios that are associated with the risk class identified of a particular trade as well as to determine a target ratio for each of the portfolios. The processor then allocates the trade among each of the portfolios based on the target ratios.

Implementations may include one or more of the following features. A target ratio can be computed for each portfolios based on available capital in each portfolio and available capital in other portfolios in the same risk class. Portfolios can include multi-strategy portfolios. A multi-strategy portfolio is associated with two or more risk classes and, correspondingly, two or more target ratios. Allocation to a multi-strategy portfolio can be based on the target ratio of the risk class matching that of the traded instrument.

A trade may be allocated in multiples of a predetermined lot size. Allocation may result in the generation of a collection of messages (e.g., one for each portfolio receiving an allocation of the trade). Each message identifies a portion of the trade allocated to a respective one of the portfolios. The trade messages generated by the allocation manager system may then be sent to a portfolio management system.

Implementations also can include facilities to correct trades (and, correspondingly, trade allocations). Correction of a trade can include receiving trade correction data at the allocation management system. The trade correction data identifies a previously-allocated trade that is to be corrected. A trade allocation history database may be queried to identify the target ratios that were used for allocating the previously-allocated trade. Trade correction messages can be generated for each portfolio involved in the previous allocation so as to alter the previous allocation(s). The trade correction messages may be sent to a portfolio management system. The portfolio management system also may maintain an accounting of the financial instruments in each portfolio and free capital associated with each portfolio. Multiple order management systems may be connected to the allocation management system using a standard network interface and message exchange protocol (e.g., the FIX protocol, an XML protocol, or other protocol). Other systems (e.g., accounting and portfolio reconciliation systems) also can be connected to the allocation manager.

The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

Allocation Manager (AM) is a trading system component that can automatically allocates a trade of a financial instrument among multiple investment portfolios. For example, a trader may purchase 100 shares of a stock "MYSTOCK" (a fictional stock ticker) and Allocation Manager may automatically allocate 60 shares from this trade into a first portfolio, and the remaining 40 shares into a second portfolio. Allocation manager can allocate a trade among multiple portfolios using classification assigned to the trade and associated with each portfolio. In the implementation described herein, Allocation Manager performs trade allocation based on a risk classification (a "risk class") that can reflect an investment strategy associated with a portfolio. Other classifications can also be used (e.g., trade or portfolio-size based classifications, trade volume-based classifications, industry segment classifications, etc.).

Figure 1:
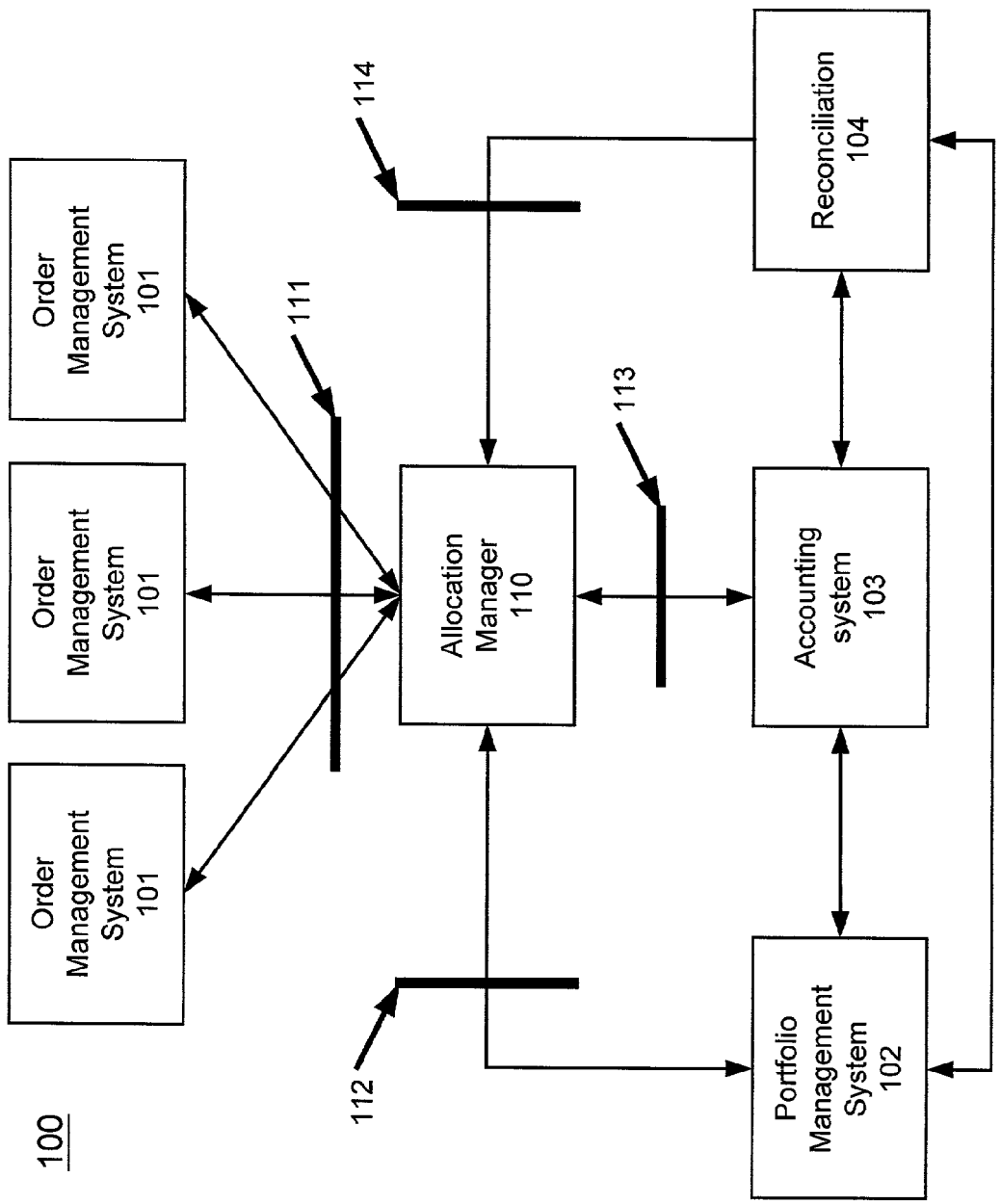
FIG. 1 is an allocation system architecture diagram.

Allocation Manager can be implemented as a "middleware" component that operates as an interface between other trading system components. FIG. 1 shows an exemplary trading system architecture in which the Allocation Manager 110 is implemented as a middleware component that, among other things, controls the flow of trade related data between one or more order management systems (OMSs) 101 (three OMSs shown), a portfolio management system 102, an accounting system 103, and a trade reconciliation system 104. Each of these systems 101–104 is discussed in further detail, below. As data being communicated between systems 101–104 flows through the Allocation Manager 110, the Allocation Manager 110 can alter that data to performs trade allocation operations that divide a trade among multiple portfolios. For example, Allocation Manager may receive data from the OMS 101 indicating that a trade occurred for three hundred shares of the stock MYSTOCK and, based a classification assigned to that trade, may allocate the three hundred shares of stock among two or more portfolios. Other operations related to allocated trades are also performed by AM 110.

Allocation Manager communicates with other systems 101–104 over messaging interfaces 111–114. Interfaces 111–114 may be software-based interfaces implemented by software application procedure calls, messaging-based interfaces communicating data between different computer system, or other types of application programming interfaces (APIs). In some implementations, one or more of the interfaces 111–114 and systems 101–104 and 110 may be implemented in a single computer, while in other implementations, one or more of the interfaces 111–114 may couple different computers over a Local Area Network (LAN) or other network connection. Although the interfaces 111–114 are logically separated, the data exchanged at each of these interfaces may transmitted over a same physical interface device. Data exchanged over the interfaces 111–114 may be in the FIX format. FIX is a data exchange protocol used within the trading industry to communicate trade-related data. The interfaces 111–114 also may include alternative or additional APIs. For example, the FIX protocol may be supplemented, replaced, or encapsulated within extensible markup language (XML)-based data transfers that can be used to exchange data over the interfaces 111–114. The trading system components 101–114 and their respective interfaces 111–114 to the Allocation Manager are detailed below:

Order Management Systems (OMSs) and OMS-AM Interface

Order Management Systems (OMSs) 101 interact with traders to execute trades, assign classifications to those trades, and manages the flow of trades between traders. The Allocation Manager can interface with one or more OMS 101 through FIX messaging and/or other API messages exchanged over the interface 111. The non-FIX API communications can be used to access AM data that is not accessible by the FIX protocol (such as the Allocation Manager's default trade allocation percentages) while the FIX messages can be used to send Allocation Manager information about filled trades. The non-FIX API communications can be implemented using database queries based on the structured query language (SQL), the Java™ Database Connectivity Protocol (JDBC), or the Open Database Connectivity (ODBC) protocol. Other data access protocols also can be used.

OMSs 101 may be built using commercially available components. For example, the El-Trader Java/CORBA based framework from InfoReach, Inc. may be used to build an OMS. Allocation Manager can receive FIX messages from the OMS detailing filled trades. Allocation Manager then allocates the filled trades according to business rules (explained below). Once the trade is allocated, a FIX message group is sent to the portfolio management system 102 detailing each allocated leg of the trade. In sending and receiving these FIX messages, Allocation Manager can use InfoReach, Inc.'s FIX Engine. This FIX engine consists of a collection of reusable Java class packages that provides for a multi-user, multi-threaded implementations of the FIX protocol.

Portfolio Management System (PMS) and PMS-AM Interface

The Portfolio Management System (PMS) 102 receives FIX messages identifying allocated trades from Allocation Manager (AM). A single trade entered at the OMS 101 and communicated to the AM 110 as a single message can result in multiple FIX messages being formed at the AM and sent to the PMS by the AM. Each of the messages in this group identifies a portion of the original trade (an "leg" of that trade) that is allocated to a particular portfolio. The PMS 102 may be implemented using commercially available components.

Accounting System (AS) and AS-AM Interface 113

The Accounting System (AS) 103 can track free capital and other data relevant to particular portfolios. This data may be exchanged between the AS and AM over an interface 113. Data provided by the AS to the AM can be used to establish the beginning-of-day capital positions for each portfolio as well as to transfer other financial and account information between the AS and AM. The Accounting System may be implemented using third-party accounting software such as the Geneva account system produced by Advent Software, Inc. The Geneva account system is a portfolio accounting system for global investors. The Geneva Accounting System provides open access to data via Microsoft Open Database Connectivity (ODBC) protocol and allows the use of industry-standard SQL-based reporting tools to access data. In a Geneva-based system, and depending on the classification data or other data required by a particular AM implementation, the data exchanged over the interface 113 may include data related to accounting, account activity, appraisal, inventory, ledger, management, parties, prices, statement, and transaction history data.

Reconciliation System (RS) and RS-AM Interface

The Reconciliation System (RS) 104 system provides account reconciliation data to the Allocation Manager. Reconciliation data may be used, e.g., to determine particular trading instruments to lock. Locked instrument data may be communicated to AM over the interface 114 and may be forwarded to OMSs 101 by the AM. The RS may be implemented using third-party software. For example, Recon software, available from Financial Models Company, Inc., may be used. Recon is a commercially available computer-based application that can work with other party's portfolio management systems and can automate reconciliation of transactions, holdings and/or cash balances between investment managers, custodians, broker/dealers and/or between internal sources.

Recon may receive data from a variety of Prime Brokers and aggregate this data to construct comprehensive trade view that will be compared to Accounting System 103 records to detect trade breaks. If a trade break is found, Recon will then send data to the Allocation Manager indicating broken trades. The Allocation Manager may use this data to determine the lock to imposed on various instrument.

Exemplary Allocation Manager Implementation

Figure 2:
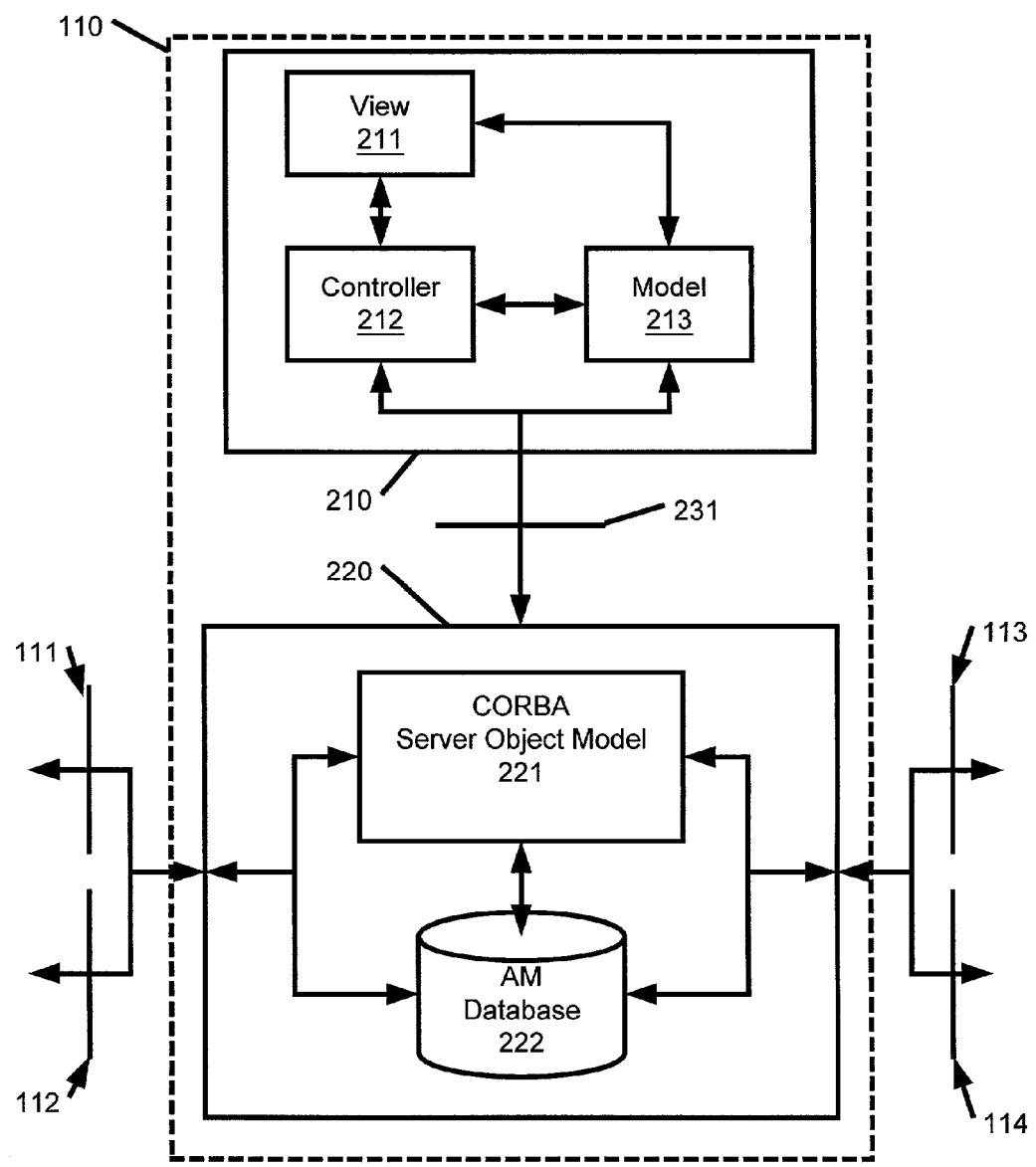
FIG. 2 is an allocation manager architecture diagram.

FIG. 2 shows a Common Object Request Broker Architecture (CORBA)-based implementation of an Allocation Manager. CORBA is a vendor-independent software component and messaging architecture and infrastructure that computer applications can use to work together over networks. A CORBA-based software architecture, along with the use of the associated Internet Inter-Operability Protocol (IIOP) standards, can facilitate communication between program independent of the type of computer, operating systems, programming language, and network in use by each program. The AM implementation 200 partitions functionality among a server 220 and a client 210 component. The server component 220 processes trade related data while the client component 210 can interact with the server component to monitor the operation of the server 220 and to configure the server's operation (e.g., by provisioning data, setting limits, etc.). The use of a CORBA-based architecture, as well as partitioning of AM functionality between separate server and client components, is optional. Other software architectures (e.g., a Microsoft Distributed COM or COM+ architecture or a proprietary architecture) may be used.

The Allocation Manager includes a database 222 that provides a central depository for trade data received from the OMSs and for journaling data about the allocated trades generated by the Allocation Manager. Data in database 222 also can serve as a repository for calculated allocation percentages, for intra-day instrument positions and for data used to audit allocation manager operations to detect errors and trade breaks. Database 222 may be an in-memory database (e.g., a data structure in RAM memory), may be a relational database (e.g., a Oracle 8i, Informix, Microsoft SQL Server, or other relational database), or may be implemented using other data storage and retrieval functions.

Allocation Manager 110 can use the database 222 to track a number of different data items. These data items are used to perform, correct, and amend trades, as well as for operations, administration, maintenance, and provisioning (OAMP) functions and report generation. Data tracked in the database 222 can include data related to (i) allocated trades; (ii) overrides (i.e., all trades that are provided allocation ratios external to the AM application; (iii) target percentages based upon each unique portfolio and Risk Class combination; (iv) lock data identifying trades that result in a lock situation; (v) exception data identifying exception situations (e.g., when an override causes a long and short position in the same instrument across funds (or Risk Classes) or when reconciliation with the Prime Broker contains a trade break (i.e., Quantity Outs and Don't Knows)); (vi) amendment data (include data about all cancelled trades as well as the corrected trades. Cancels and corrects are linked using a reference ID number).

Examples of data that may be used by the Allocation Manager, and which can be stored in the database 222 follow:

Allocation Percentage—An allocation percentage data field contains data identifying trade allocation ratios used by Allocation Manager to allocate a trade.

Allocation Size—An allocation size data field contains data identifying a number of shares or contracts allocated to a portfolio and Risk Class.

AM Identifier—The AM identifier data field contains an identifier assigned to legs of a trade that are formed by the Allocation Manager during the process of allocating an original trade to multiple portfolios (each allocated leg receives a unique AM ID which, in conjunction with an OMS ID, can be used to create a unique record.

Buy/Sell Indicator—The Buy/Sell Indicator identifies the side of a transaction. Values may include, e.g., Buy, Sell, Sell Short, and Cover Short.

Cancel/Correct Identifier—This field identifies whether the transaction is a cancel or a correct. The field is generated by a Trade Amendment Tool (TAT).

Comments—When a trade is entered with an override allocation percentage, a trader may be prompted to enter a reason for the override. The comment field contains the entered reason and can be provided to Allocation Manager for review and/or for decision processing.

Default Percentage—The Default Percentage field contains a default allocation percentage that Allocation Manager would have applied to an overridden trade if the trade had not been overridden.

Entity—This field identifies owning entity information associated with a fund.

Fund—The Fund field captures the structure of the fund and indicates if it is part of the Multi-strategy fund or if it is an independent strategy (e.g., convertible bonds, risk arbitrage, and relative value).

Instrument—The instrument field contains the symbol in which the trade was made.

Last Update—The Last Update field identifies a date when the target percentages last changed.

Lock Type—The type of lock imposed by Allocation Manager on a given trade. Values may include Hard Lock, Soft Lock, and Queue.

OMS Identifier—The OMS identifier is passed in a FIX message to Allocation Manager. It is a unique identifier assigned to a trade by an OMS.

Order Size—Provides the size of an original trade. This field does not contain any allocated amounts.

Override Percentage—The Override Percentage is the allocation percentage entered externally that overrides the Allocation Manager's allocation and rounding rules.

Risk Class—The Risk Class field identifies a risk classification associate with a trade or portfolio. For example, the Risk Class may indicate that a trade is to be allocated among convertible bond portfolios or among risk arbitrage portfolios.

Subtotal—The Subtotal field contains the aggregate total of percentages for the specific Risk Class.

Terminal Identifier—The Terminal identifier identifies a trading terminal from which the trade was input to an OMS. This data element is passed to Allocation Manager via the FIX message. In the case of an amendment or correction, the Terminal identifier may contains the machine name on which the target percentage was changed.

Time—A number of different time parameters may be recorded including, among others, the system time at which target percentages were changed; the time that a trade was entered into the OMS system or a change was entered; an the time at which a trade was filled.

Trade Date—The trade date indicates the date when a trade was filled.

User Identifier—The User identifier is an identifier (e.g., a login name) of the user that input the trade into OMS. This is passed to Allocation Manager by a FIX message.

The database 222 may contain additional or alternative data. Furthermore, the foregoing data fields may be logically interrelated in database records and may appear at different places (i.e., in different database records and in different record types).

The AM processes data received from systems 101–104, as well as data in the database 222 using business rules. Each business rule includes logic used to control an allocation operation. The example business rules contained herein implement a trade allocation scheme whereby trades can be allocated based upon target percentages for opening transactions and closing ratios for closing positions. An AM can validate the side of the trade and also the position of the instrument being traded and determine if the trade is an opening or closing transaction. An AM also can determine the trade type identifier (e.g., buy, sell, sell short, cover short, and short against the box). Trades may be allocated among one or more portfolios and risk classes subject to the trader's discretion.

An AM can allocate trades among multiple portfolios based on free capital positions in each portfolio. These free capital positions are used to calculate target percentages that determine how a particular trade is allocated among multiple portfolios and risk classes. The free capital in a portfolio may be further subdivided based on one or more risk classes associated with the portfolio. Free capital data can be automatically obtained, e.g., by a data transfer over the interface 113 between the AM and the AS 103. In some implementations, free capital data also can be manually entered through an Allocation Manager interface.

An AM also may accept override trades from the OMS. An override trade contains trader-specified allocations of a traded instrument among various Risk Classes; the AM allocates an override trade according to the received allocation data (i.e., override trades may be used to inhibit automatic allocation functionality of the Allocation Manager). In processing an override trade (as well as during non-override trade processing), the Allocation Manager may implement validation functions to determine whether allocation of the traded instrument results in an error condition (e.g., a long and short position in the same instrument across funds). Data pertaining to an overridden trade can be logged with a flag indicating that the trade was overridden. In addition to overrides, an AM also may process corrections, amendments, and cancellations of trades. Allocation Manager can update its database of portfolio positions on canceling or correcting a trade.

Trades may be allocated to particular investment portfolios based on a risk class associated with the trade and with particular portfolios. In some cases, a particular investment portfolio may be associated with multiple different risk classes. Similarly, a single risk class may be associated with multiple different portfolios. In the following description, business rules (i.e., business logic) and processes that can govern a trade allocation process are further described.

Target Ratios

A trade may be allocated among portfolios in a risk class based on a set of target ratios. Target ratios refer to the ratios at which positions can be opened within the various portfolios associated with a particular risk class. These ratios may be updated on demand (i.e., in real time) or at predetermined intervals (e.g., at the end of every month or quarter). For each risk class, a series of target ratios determining how trades assigned to that risk class are divided among investment portfolios. The target ratio for a given portfolio and risk class combination is defined as:

$$TargetRatio = \frac{\text{Available Capital in Portfolio + Risk Class combination}}{\text{Total Free Capital in Risk Class}}$$

The target ratios for a particular risk class can be calculated based on the free capital available in each investment portfolio that is a member of that risk class The ratios for each risk class sum to 100%, thus ensuring that a trade is completely allocated among relevant portfolios.

In the disclosure that follows, Allocation Manager operations are explained using the six exemplary portfolios described in the following table:

| Abbreviated Name | Portfolio Full Name and Description |
|---|---|
| LUX-RA | Luxembourg Risk Arbitration<br>A portfolio of Risk Arbitration (RA) investment instruments invested through a Luxembourg entity. |
| LUX-LC | Luxembourg Long Converts<br>A portfolio of Long Converts (LC) investment instruments invested through a Luxembourg entity. |
| LUX-MS | Luxembourg Multi-Strategy<br>A portfolio for multi-strategy investment (e.g., containing both RA and LC investment instruments) invested through a Luxembourg entity. |
| CAY-RA | Caymans Risk Arbitration<br>A portfolio of Risk Arbitration (RA) investment instruments invested through a Cayman Islands entity. |
| CAY-LC | Cayman Long Converts<br>A portfolio of Long Converts (LC) investment instruments invested through a Cayman Islands entity. |
| CAY-MS | Cayman Multi-Strategy<br>A portfolio for multi-strategy investment (e.g., containing both RA and LC investment instruments) invested through a Cayman Islands entity. |

Data in an Allocation Manager database can be used to identify one or more risk classes (e.g., a "Risk Arbitration" (RA) risk class or a "Long Converts" (LC) risk class) associated with each of these portfolios. In addition, the Allocation Manager can track the free capital amounts available in each portfolio. The following table identifies a set of example portfolios and their risk class(es) as well as the free capital amount for each portfolio/risk class combinations:

| Portfolio | Risk Class | Free Capital |
|---|---|---|
| LUX-RA | RA | 100 |
| LUX-LC | LC | 200 |
| LUX-MS | RA | 120 |
| LUX-MS | LC | 80 |
| CAY-RA | RA | 300 |
| CAY-LC | LC | 400 |
| CAY-MS | RA | 60 |
| CAY-MS | LC | 40 |
| Total Free Capital | | 1300 |

The Allocation Manager can determine the total free capital per risk class as follows:

Total free capital in the risk arbitration (RA) risk class=100+120+300+60=580

Total free capital in the long converts (LC) risk class=200+80+400+40=720

For portfolios associated with the RA risk class, the Allocation Manager calculates the target ratios as indicated in the following table:

| Portfolio | Risk Class | Free Capital | Total Free Capital | Target Ratio |
|---|---|---|---|---|
| LUX-RA | RA | 100 | 580 | .172 |
| LUX-MS | RA | 120 | 580 | .207 |
| CAY-RA | RA | 300 | 580 | .518 |
| CAY-MS | RA | 60 | 580 | .103 |
| Total | | 580 | | 1.00 |

For portfolios associated with the LC risk class, the Allocation Manager calculates the following target ratios:

| Portfolio | Risk Class | Free Capital | Total Free Capital | Target Ratio |
|---|---|---|---|---|
| LUX-LC | LC | 200 | 720 | .278 |
| LUX-MS | LC | 80 | 720 | .111 |
| CAY-LC | LC | 400 | 720 | .556 |
| CAY-MS | LC | 40 | 720 | .055 |
| Total | | 720 | | 1.00 |

Any given unique portfolio and risk class combination may have zero free capital available. In such a case, a target ratio does not need to be calculated for the portfolio as a default percentage of zero may be used. The Allocation Manager uses the latest calculated target ratios to allocate new trades. The Allocation Manager can also maintain a history of all updates to the target ratios in a database. This history information may be used, e.g., if a previous trade allocation must be rolled-back due to an error or other reason for amendment of a previous the trade.

Each portfolio can include one or more tradeable instruments. For example, a tradeable instrument may be publicly or privately traded stocks. For each instrument traded in each portfolio, the portfolio may contain a position that is either long (>0), short (<0) or flat (=0) with respect to that instrument. An allocated trade may create an opening position (i.e., a long or a short position) or a closing position in a particular fund. Allocation of a trade may differ depending on the type of position created.

Allocating Opening Positions

If a trade creates an opening position, Allocation Manager allocates the trade using the available target ratios (unless otherwise overridden). An opening position is defined as a trade that causes a flat or long position to go longer or a flat or short position to go shorter. For example, if the RA class of the LUX-MS has a flat position with respect to the stock MYSTOCK (a fictional stock ticker), a trade to buy 100 shares of a RA class stock MYSTOCK will create an opening position for MYSTOCK in the LUX-MS portfolio. An opening position also occurs where, e.g., a trade is made to sell 300 shares of MYSTOCK for LUX-MS that contains a short position (−100 shares) in MYSTOCK. The allocation amount on an opening position, therefore, will be calculated as follows:

AllocationAmount=TargetRatio×TradeVolume

Where:

Target Ratio=The opening position ratio as defined in the previous section

TradeVolume=Instrument share amount from OMS

Trades can be allocated across all risk classes associated with the given strategy of the trade. In some implementations, exceptions to this general allocation scheme may exist. One possible exception is an override. An override is a special case in which the trader decides to allocate a trade using different allocation percentages from the default percentages contained in Allocation Manager. For example, an override allows a trader to allocate 100% of an opening trade in a RA class stock MYSTOCK to CAY-MS instead of allowing the Allocation Manager to split the trade according to the AM's target percentages. Data entered by the trader at the OMS, and communicated to the Allocation Manager via a FIX message, can be used to instruct the Allocation Manager to perform this special-case allocation. Such special case processing is discussed in greater detail, below.

Allocating Closing Positions

A closing position is defined as a trade that decreases a long or short position. If the position is flat, the next trade regardless of whether it is a short sell or a buy, will be an opening position. If a trade creates a closing position in a portfolio, that trade may be allocated based on a portfolio's current position in that instrument relative to the position across funds. Examples of a closing position include:

A trade is made to sell 100 shares of the RA risk class stock MYSTOCK in the LUX-MS portfolio when the LUX-MS portfolio contains a long position of MYSTOCK of 200 shares.

A trade is made to buy 100 shares of MYSTOCK for the LUX-MS portfolio when the LUX-MS portfolio contains a short position of MYSTOCK of 300 shares (−300 shares).

Closing a position in a fund relative to the total position in all the funds with similar risk classes ensures that as a position is closed, all funds approach a flat position in the particular instrument. This approach distributes the risk associated with the closing position across funds.

If the trade creates a situation where the position will go from long to short or from short to long then it is referred to as crossing the zero boundary, or a boundary trade. In this situation, Allocation Manager may first close (flatten) the position, using the closing position rules, then open a new position using the opening positions rules.

For a closing position, the close ratio is calculated as follows:

$$CloseRatio = \left[\frac{CurrentRiskClassPosition}{TotalRiskClassPosition}\right]$$

Where:

CurrentRiskClassPosition=Current position by Portfolio, risk class and Instrument prior to the trade TotalRiskClassPosition=Total position by Risk Class, and Instrument prior to the trade The allocation share amount can be derived by the Allocation Manager by a multiplication of the CloseRatio by the number of shares in the trade (i.e., trade volume). The equation is:

AllocationAmount=CloseRatio×TradeVolume

Where:

TradeVolume=Instrument share amount from OMS

For example, assuming that the current positions in MYSTOCK are held by the following funds:

| Portfolio | Risk Class | Position |
|---|---|---|
| LUX-RA | RA | 200 |
| LUX-MS | RA | 300 |
| CAY-RA | RA | 900 |
| CAY-MS | RA | 100 |
| Total | | 1500 |

A transaction to sell 1500 shares of MYSTOCK will be a closing positions transaction and will be allocated as follows:

LUX-RA/RA=[200/1500]*−1500=−200

LUX-MS/RA=[300/1500]*−1500=−300

CAY-RA/RA=[900/1500]*−1500=−900

CAY-RA/MS=[100/1500]*−1500=−100

If the transaction had involved a sell of 1000 shares, the allocated share amounts would equal −133.333, −200, −600, and −66.667, respectively. In some implementations, shares must be allocated in integer amounts and, in some cases, in particular sized lots (e.g., allocation may be in units of 100 shares and multiples thereof; ). Allocation Manager may invoke a set of rounding rules to avoid unwanted allocations of fractional shares and unwanted odd-lot allocations. Rounding rules are discussed further, below.

Allocating Across Risk Classes

In some implementations, an Allocation Manager may incorporate functionality to allocate trades across Risk Classes (e.g., a particular trade may be allocated across both the RA and LC risk classes). To do so, the Allocation Manager may separate an original trade into multiple trades designated for each Risk Class and then process the trades according to the prescribed allocation percentages.

For a multi-risk class trade (i.e., a multi-strategy trade), the different risk classes, and a percentage allocation of the trade into the different risk class, may be specified by a trader at an OMS interface. FIX message parameters may be used to communicate this risk class allocation from the OMS to the Allocation Manager. For example, the OMS may create a delimited string in a FIX message's custom field to identify the risk classes requested. Allocation Manager can parse this risk class identification string and create an allocation for each risk class identified. Other FIX custom data elements describing the selected risk class allocation would be delimited similarly. When a trade is allocated among multiple risk classes, FIX sequence numbers (i.e., the sequence numbers contained in the ExecID and ExecRefID) fields can be generated to track each of the allocated legs. In addition, operations to determine, validate, and handle allocation errors, as well as other transaction processing, may be repeated on a per-Risk Class basis. For example, Cancels and correct operations will be repeated for each of the different risk classes.

Rounding Rules

Allocation of a trade may cause a round lot trade to be broken into fractional shares (and contracts) and into odd lots. The Allocation Manager may avoid allocation by fractional shares or into odd lots using rounding rules. Rounding rules may be specific to certain types of instruments, risk classes, etc. For example, allocated equities may be rounded to a lot size of 100 shares, while options and futures may be rounded to 1 contract. In some cases, these limits are fixed, while in others they are user-definable (e.g., a user may set the minimum lot rounding size through a graphical user interface).

Target and Closing Ratios

The Allocation Manager ensures that target ratios and closing ratios add to 100% for each Risk Class. Rounding may result in a in which the sum of the target or closing ratios per Risk Class is not 100%. The Allocation Manager may implement rules to adjust ratios to 100%. The following are a set of example adjustment rules:

1. Calculate the difference between 100% and the sum of the rounded ratios.
2. Add the difference to the Entity, Fund, Risk Class with the greatest ratio (target or closing).
3. If two or more ratios are equal, the difference may be applied to one or more of those funds in a pre-designated order. For example, if both Multi-strategy funds (CAY-MS and LUX-MS) have equal ratios, the CAY-MS fund may receive the difference. If a Multi-strategy fund is not involved then a single strategy fund (e.g., CAY-RA, CAY-LC, LUX-RA, or LUX-LC) can receive the difference.

The following example illustrates application of the target ratio rounding rules. Each table demonstrates how the Allocation Manager application would allocate a trade based on the given free capital and position information.

Given the current free capital figures:

| Portfolio | Risk Class | Free Capital | Total Free Capital | Rounded Target | Rounding Rules Applied |
|---|---|---|---|---|---|
| LUX-RA | RA | 100 | 580 | .172 | .172 |
| LUX-MS | RA | 120 | 580 | .207 | .207 |
| CAY-RA | RA | 300 | 580 | .517 | .518 |
| CAY-MS | RA | 60 | 580 | .103 | .103 |
| Total | | 580 | | .999 | 1.00 |

In this case, the sum of the rounded target ratios does not equal 100%, but rather 99.9%. The rounding rules may result in the additional 0.1% being added to the CAY-RA portfolio because the fund possesses the greatest amount of free capital (i.e., the fund possesses the greatest rounded target ratio).

Assume that LUX-RA portfolio receives a $1000 infusion of capital and the CAY-RA portfolio receives a $800 infusion of capital. The target ratios would adjust as follows:

| Portfolio | Risk Class | Free Capital | Total Free Capital | Rounded Target | Rounding Rules |
|---|---|---|---|---|---|
| LUX-RA | RA | 1100 | 2380 | .462 | .462 |
| LUX-MS | RA | 120 | 2380 | .050 | .050 |
| CAY-RA | RA | 1100 | 2380 | .462 | .463 |
| CAY-MS | RA | 60 | 2380 | .025 | .025 |
| Total | | 2380 | | .999 | 1.00 |

In this case, the sum of the rounded target ratios does not equal 100%, but rather 99.9%, and the LUX-RA/RA fund and the CAY-RA/RA fund have the same amount of free capital (and rounded target ratios). In this case, assuming that precedence is given to the Cayman Island funds (CAY- RA, CAY-LC, CAY-MS), the Allocation Manager adds the additional 0.1% to the CAY-RA fund.

If an additional $980 were added to the LUX-MS/RA portfolio (i.e., the Risk Allocation portion of the multi-strategy LUX-MS portfolio), the ratios would be calculated as follows:

| Portfolio | Risk Class | Free Capital | Total Free Capital | Rounded Target | Rounding Rules |
|---|---|---|---|---|---|
| LUX-RA | RA | 1100 | 3360 | .327 | .327 |
| LUX-MS | RA | 1100 | 3360 | .327 | .328 |
| CAY-RA | RA | 1100 | 3360 | .327 | .327 |
| CAY-MS | RA | 60 | 3360 | .018 | .018 |
| Total | | 3360 | | .999 | 1.00 |

In this case, the sum of the rounded target ratios does not equal 100%, but rather 99.9%. In addition, the LUX-RA fund, the LUX-MS/RA fund, and the CAY-RA fund all have the same amount of free capital (and rounded target ratios). In this case, the Allocation Manager may add the additional 0.1% to the LUX-MS/RA fund (assuming that Multi-Strategy funds have priority over risk-allocation-only funds).

Opening Positions

When Allocation Manager receives an opening trade that produces a fractional or odd lot allocation, the Allocation manger can employ rules to calculate the number of shares to apply to the respective funds. For example, the following rules may be used:

AppliedAllocation=Round, LotSize[Allocation_Amount]

Where:

Allocation_Amount=The Allocation$_{13}$ Amount value is the number of shares determined to be allocated to a particular portfolio and risk class. The Accocation_Amount value may be derived by multiplying the trade volume by the target ratio for an opening position or the close ratio for a closing position Round,LotSize=Round,LotSize represents a function that will round the Allocation Amount according to the minimum allowable rounding size (this size may be predetermined or configurable).

This opening position calculation is repeated for each portfolio having a risk class that matches the relevant trade's risk class. For example, assume that there is an opening trade of 1000 shares in MYSTOCK which is in the RA risk class, and that the current target ratios are as follows:

| Portfolio | Risk Class | Free Capital | Target Ratio |
|---|---|---|---|
| LUX-RA | RA | 100 | .172 |
| LUX-MS | RA | 120 | .207 |
| CAY-RA | RA | 300 | .518 |
| CAY-MS | RA | 60 | .103 |
| Total | | 580 | 1.00 |

For a lot rounding size of 100, the Allocation Manager can allocate the trade as follows:

LUX-RA/RA=Round,$_{100}$[0.172*1000]=172, round to 200

LUX-MS/RA=Round,$_{100}$[0.207*1000]=207, round to 200

CAY-RA/RA=Round,$_{100}$[0.518*1000]=518, round to 500

CAY-MS/RA=Round,$_{100}$[0.103*1000]=103, round to 100

The allocated trades sum to 1000 shares, which equals the trade amount.

In some cases, rounding the trades to lot sizes may result in under-allocation or over-allocation of a trade. For example, for a trade of 1200 shares of MYSTOCK, the following results may be obtained:

LUX-RA/RA=Round,$_{100}$[0.172*1200]=206.4, round to 200

LUX-MS/RA=Round,$_{100}$[0.207*1200]=248.4, round to 200

CAY-RA/RA=Round,$_{100}$[0.518*1200]=621.6, round to 600

CAY-MS/RA=Round,$_{100}$[0.103*1200]=123.6, round to 100

The allocated trades sum to 1100, but the trade was for 1200. Differences arising between the allocated volume and the trade volume on an opening position will be applied to the portfolio and risk class with the greatest amount of free capital. If free capital is not updated in real time, the portfolio and risk class with the highest target ratio on an opening position may be considered to have the highest amount of free capital. In such a case, CAY-RA/RA will receive 100 shares of MYSTOCK to equate the allocation to the trade. CAY-RA/RA will, therefore, receive 700 (600+100) shares total.

Trades of less than a round lot can be allocated to the fund with the greatest amount of free capital. If several funds have equal target ratios, the trade may be allocated based on the above preference mechanism (other preference mechanisms can also be used).

Closing Positions

Closing position trades may be rounded to the nearest unit. For example, assuming the current positions for MYSTOCK are as follows:

| Portfolio | Risk Class | Position |
|---|---|---|
| LUX-RA | RA | 200 |
| LUX-MS | RA | 300 |
| CAY-RA | RA | 900 |
| CAY-MS | RA | 100 |
| Total | | 1500 |

A transaction to sell 1000 shares of MYSTOCK will be a closing position transaction and will be allocated as follows:

LUX-RA/RA=[200/1500]*−1000=−133.33, round to −133

LUX-MS/RA=[300/1500]*−1000=−200, round to −200

CAY-RA/RA=[900/1500]*−1000=−600, round to −600

CAY-RA/MS=[100/1500]*−1000=−66.667, round to −67

Funds may, therefore, contain odd lots, but the risk in closing a position will be evenly disbursed to the funds in relation to the current amount of risk held by the fund. This proportionally reduces the position in each portfolio to zero, without creating a long and short position between portfolios. For example, if the MYSTOCK transaction were a sell of 1490, the allocation would be:

LUX-RA/RA=[200/1500]*−1490=−198.667, round to −199

LUX-MS/RA=[300/1500]*−1490=−298, round to −298

CAY-RA/RA=[900/1500]*−1490=−894, round to −894

CAY-RA/MS=[100/1500]*−1490=−99.333, round to −99

This allocation would produce the following ending positions:

| Portfolio | Risk Class | Position |
|---|---|---|
| LUX-RA | RA | 1 |
| LUX-MS | RA | 2 |
| CAY-RA | RA | 6 |
| CAY-MS | RA | 1 |
| Total | | 10 |

If two or more funds have the same position and closing ratio, differences in rounding may be allocated using rules that prioritize particular portfolios and/or risk classes.

In some implementations, closing transactions may be rounded using minimum rounding lot sizes. Special allocation rules may need to be applied when odd lot position exists in one or more of the funds (this situation may occur on an opening position as well when the positions are short). Assume, e.g., that the current positions for MYSTOCK are as follows:

| Portfolio | Risk Class | Position |
|---|---|---|
| LUX-RA | RA | 70 |
| LUX-MS | RA | 300 |
| CAY-RA | RA | 600 |
| CAY-MS | RA | 30 |
| Total | | 1000 |

A transaction to sell 1000 shares of MYSTOCK is a closing position transaction and can be allocated as follows:

LUX-RA/RA=[70/1000]*−1000=−70, round to −100

LUX-MS/RA=[300/1000]*−1000=−300, round to −300

CAY-RA/RA=[600/1000]*−1000=−600, round to −600

CAY-RA/MS=[30/1000]*−1000=−30, round to 0

As a result, the overall collection of portfolios being managed will contain long and short positions within the same risk class. This is shown in the following table:

| Portfolio | Risk Class | Position |
|---|---|---|
| LUX-RA | RA | −30 |
| LUX-MS | RA | 0 |
| CAY-RA | RA | 0 |
| CAY-MS | RA | 30 |
| Total | | 0 |

This creation of both long and short positions may be considered erroneous. An validation procedure may be used to automatically rectify this allocation error by applying the short position to the long position to thereby flatten both positions.

Zero Boundary Transactions

Zero Boundary transactions are trades that cause an instrument's position to move from long to short or short to long.

When a trade (e.g., a sell transaction) results in change from a long to a short position, that trade is processed by the Allocation Manager as if it consists of both a closing transaction and an opening transaction. The closing portion of the transaction reduces the position in each fund to zero (i.e., flat). The opening portion of the transaction in accordance with the rules explained above. Similarly, a buy transaction that results in a change from a short to a long position is treated as consisting of both a closing transaction and an opening transaction. The closing transaction increases the position in each fund to zero (i.e., flat). The opening transaction then creates a long position.

Amendments and Overrides

An amendment to an allocated trade may be performed by a Trade Amendment Tool (TAT). The Trade Amendment Tool may be a facility of the OMS, or may be implemented as a separate system. To effect an amendment, a correction message is sent from the TAT to the Allocation Manager. The correction message may include a reference ID to identify the originally entered trade that is to be corrected. Allocation Manager can use the reference ID to match the correction to multiple allocated trades and submit a cancel message to the Accounting System. The correction may be allocated according to the original allocation percentages which may be obtained from a database storing a history of allocation percentages. When a correction changes the instrument, strategy, or quantity, the positions stored in Allocation Manager are correspondingly changed. If the user wishes to edit the percentages of the allocated legs, a trade can be canceled and a new trade entered through the TAT.

When an override is entered, Allocation Manager executes validation routines to ensure that the override does not create an allocation error. If an error is created, the override may be automatically rejected. In some implementations, security features (e.g., password limited access) may restrict access to the TAT. For example, the TAT may be available to operations personnel, but not to traders.

Allocation Manager may accept overrides from OMS without applying the allocation and rounding rules. Validation of the override data may take place in OMS while Allocation Manager may determine if the trade meets required validation criteria. If the validation criteria are met, Allocation Manager will update its intra-day positions and send the trade to the risk management system.

Automated Amendments

In some implementations, amendments and corrections may be automatically generated or electronically received at an interface from, e.g., an interface to another broker's system (an external broker interface). Electronic amendments may be transmitted to the Allocation Manager on an intra-day basis. When a modification or correction message is received at an external broker interface, that message may be processed at the OMS. The OMS processing may include, e.g., locating the OMS ID that was assigned to the original trade. The original trade's data may be updated in the OMS database and a FIX message may be transmitted to the Allocation Manager to amend the trade. At the Allocation Manager, the electronic amendment message can be matched to the multiple allocated trades (using the OMS ID) and cancel messages generated for each allocated trade. The cancel messages are transmitted from the Allocation Manager to the Accounting System.

Exception Processing

Allocation exceptions may occur for a number of different reasons. When an allocation exception occurs, the Allocation Manager may "hard lock" the affected instrument. A hard lock prevents or limits further processing of trades in the affected instrument until the exception condition is resolved. Hard locks may be applied when, e.g., an override causes a long and short position in the same instrument across funds (or Risk Classes) or when reconciliation with an external broker contains a trade break. Processing of these two exceptions are discussed in greater detail in the following sections.

Override Allocation Error

Overrides are received from the OMS system and may occur for a variety of reasons. For example, overrides may be used to re-align the risk in a given portfolio and risk class with a current amount of free capital. This may occur, for example, following a large infusion of cash into a single fund that distorts the risk of a given position relative to the overall fund.

Overrides may be for either buys or sells and may be on either opening or closing positions. Overrides are sent from the OMS to the Allocation Manager as FIX messages containing data that specifically marks these messages as overrides. Processing of these override messages will, in general, bypass Allocation Manager allocation and rounding rules. When processing an override message, Allocation Manager determines if the override is valid relative to the current position of the instrument in a particular risk class. The override is valid if it does not create a long and short position in the same instrument across funds. If the override is valid, then the Allocation Manager will adjust its intra-day positions for this instrument and submit the trade to the portfolio management system 102. If the override is invalid then Allocation Manager will flag the trade as an exception and reject the trade. Rejected trades must be investigated, fixed, and re-entered into TAT. Since this "trade" is not a cancellation or correction of a trade stored in Accounting System 103, it may be processed as a new trade. In some implementations, this trade may be flagged as an amendment, thus permitting it to pass through the Allocation Manager without being subject to a lock queue.

Rejected trades automatically create a lock and all trades in the particular instrument subsequent to the lock are queued. The locked trade and subsequent trades (in the same instrument) are not submitted to TPOS because subsequent allocations are based on the correct allocation of the locked trade (opening and closing trades are allocated differently).

By locking on the instrument regardless of the Entity and Risk Class, the system protects the integrity of the allocations considering that the user may have entered the override trade's Risk Class incorrectly. The rejected trade is stored allowing operations to investigate the error and re-enter the trade through TAT. Only trades entered into TAT can pass by the locked queue since they possess an amendment flag that indicates that they are meant to amend a trade. In this case, an allocated Accounting System trade is not being cancel/corrected, but rather a new trade is being entered as an amendment to correct the rejected trade. This "amendment" will be submitted to TPOS if it is valid (i.e., does not create an error condition).

When a rejected trade has been amended, operations will open the Lock Window and remove the instrument from the list of locked instruments. This action will automatically release in sequential order the queued trades for that instrument. The positions will be updated and the trader will process the allocations as intended.

Users may be notified via a standard mail API of an override allocation error. The e-mail addresses of the recipient(s) can be stored in the Allocation Manager database.

Trade Break

Trade breaks are caused when the reconciliation with a Prime Broker returns discrepancies. Trade breaks may be determined based on daily reports generated by the Reconciliation System and which containing trade breaks determined from the previous day's data. When the report is received, it is uploaded to the Allocation Manager with a flag indicating that trade breaks are to be created. Based on data in the Reconciliation System report(s), a lock on a particular instrument is created. Subsequent trades in the locked instrument may be queued in the order that they are received until the lock is removed. In general, a lock is removed following resolution of the trade discrepancy that resulted in the lock. If the trade requires an amendment, the user will use TAT to cancel/correct the trade. A lock may be removed when Allocation Manager receives a new Reconciliation System report. The new report can update trade breaks, thereby, removing a previous day's lock. User may be notified via a standard mail API of a soft lock situation. The e-mail addresses of the recipient(s) will be stored in the Allocation Manager database.

Allocation Gaps

Gaps within the allocation process may exist despite the implementation of hard locks. A first type of gap involves trade breaks. Trade breaks may be detected, e.g., the day after a break occurs. However, following a trade break, and prior to its detection, an incorrect trade may be allocated based on a current target or closing ratios. This trade will then impact the positions within the funds that it was allocated to. Subsequent trades in the same instrument will be allocated according to the new position percentages in the case of a closing transaction. If the previous trade was incorrect the closing transactions throughout the day will be improperly allocated. If there is a large volume of trades in the affected instrument, there may be difficulties in canceling trades subsequent to the break and reentering them after the trade correction is made. The Allocation Manager can include OAMP functionality allowing impacted transactions to be determined and enabling the generation of a report that isolates the impacted trades. This process helps to mitigate allocations based on inaccurate position data.

The second gap type occurs where the incorrect trade is identified on the day of its occurrence and is corrected using the TAT application. Although the trade can be cancelled and corrected, subsequent trades may have been allocated based on the assumption that the preceding trades (and, therefore, positions) were correct. Subsequent trades in the same instrument will be allocated according to an erroneous position in the case of a closing transaction.

End of Day Processing

At the end of the trading day, Allocation Manager can forward to the Reconciliation System a position file containing all instrument positions as of the close of the trading day. This position file may be compared to a position file generated by the Accounting System. A comparison of these different position files can be used to ensure that the Accounting System has received all allocated trades from Allocation Manager. If the position files disagree, operations can research the discrepancies and resolve the differences before the next day open.

ID Specifications

Allocation Manager (and the various systems that Allocation Manager ultimately interfaces with) can include functionality to track and identify unique trades. Trade tracking information can be used for other operations such as trade cancellation and correction. Each trade received from a particular OMS 101 can include a unique trade identifier that, in part, can be used by Allocation Manager to track trades. However, because OMS may independently assign trade identifiers, the Allocation manager may need to add additional identifier information to the OMS identifier (or may replace the OMS supplied identifier) to ensure that trade identifiers are unique across all trades from all OMSs. This helps to ensure that the particular OMSs from which a trade originated can be identified as trades flow through, e.g., the Accounting System 103, Portfolio Management System 102, and other trading systems. Furthermore, for allocated trades, additional information is added to the OMS identifier so that each allocated portion of the trade can be tracked. This additional information may be a "leg" identifier that, in combination with the OMS identifier, is unique for every allocated portion (i.e., for each allocated trade sent to the other trading systems 102–103)

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. For example, the current FIX message system does not support convertible bonds. FIX may be modified, or a different protocol substituted, so that the Allocation Manager can interpret convertible bond data. Accordingly, other embodiments are within the scope of the following claims.

What is claimed is:

1. A computer-implemented method of allocating a trade of a number of same financial instruments among a plurality of different, concurrently available portfolios, the method comprising the steps of:

receiving, at an allocating management system from an order management system, a message descriptive of a trade of a number of same financial instruments, the message comprising a financial instrument identifier and a size of the trade;

determining a risk class associated with an identified financial instrument;

determining a first plurality of portfolios associated with the risk class and a target ratio for each of the portfolios, wherein each of the first plurality of portfolios is different from the others of the first plurality of portfolios and is concurrently available for holding one or more of the financial instruments; and allocating the trade of the number of financial instruments among each of the first plurality of portfolios based on the target ratio associated with each of said portfolios, such that each of the first plurality of portfolios is allocated a portion of the number of the financial instruments based on the target ratio, wherein at least one of said steps is performed by a computer.

2. The method of claim 1 wherein the message further comprises an identifier of a risk class and determining the risk class associated with the identified financial instrument comprises determining based on the identifier of the risk class.

3. The method of claim 1 further comprising:

computing a target ratio for each of the first plurality of portfolios based on available capital in each portfolio and available capital in other portfolios in the first plurality.

4. The method of claim 3 wherein:

a first portfolio in the first plurality comprises a multi-strategy portfolio that is further associated with a second risk class;

computing a target ratio for the first portfolio further comprises computing a second target ratio based on the second risk class.

5. The method of claim 4 wherein computing the second target ratio comprises computing based on available capital comprising a portion of the first portfolio associated with the second risk class and available capital in other portfolios associated with the second risk class.

6. The method of claim 1 wherein allocating the trade further comprises:

allocating a quantity to each of the first plurality of portfolios such that a sum of the allocated quantities equals the size of the trade.

7. The method of claim 6 wherein allocating comprises allocating the size among each of the first plurality of portfolio based on a multiple of a predetermined lot size.

8. The method of claim 6 further comprising:
for each one of the first plurality of portfolios, generating a trade message comprising the financial instrument identifier, the quantity allocated to the one of the portfolios, and an identifier of the one of the portfolios; and
sending each of the generated trade messages to a portfolio management system.

9. The method of claim 1 further comprising:
receiving trade correction data at the allocation management system, the trade correction data identifying the trade of the identified financial instrument;
querying a trade allocation history database to identify the target ratios used for allocating the trade among the first plurality of portfolios; and
generating a plurality of trade correction messages, each correcting the allocation of the trade of the first financial instrument to a different one of the first plurality of portfolios.

10. The method of claim 9 further comprising sending the trade correction messages to a portfolio management system.

11. The method of claim 10 wherein the portfolio management system maintains an accounting of the financial instruments in each portfolio and free capital associated with each portfolio.

12. The method of claim 9 wherein the target ratios associated with the first plurality of portfolios at a time of receipt of the trade correction data is different from the target ratios used for allocating the trade.

13. The method of claim 1 wherein the message further comprises a trade type selected from the group consisting of a buy order and a sell order.

14. The method of claim 1 wherein the order management system is one of a plurality of order management systems, each order management system being able to exchange messages with the allocation management system, the messages comprising messages descriptive of trades of financial instruments.

15. The method of claim 14 wherein each message is exchanged over a network interface using a standard message exchange protocol.

16. The method of claim 15 wherein the standard message exchange protocol comprises the FIX protocol.

17. The method of claim 1 further comprising:
receiving at the allocation management system a second message descriptive of a trade of a second financial instrument, the second message comprising a financial instrument identifier, a size of the trade, and allocation data;
allocating the trade of the second financial instrument among a second plurality of portfolios based on the allocation data in the second message.

18. The method of claim 17 wherein the allocation data comprises target ratio data.

19. A trade allocation system for allocating a trade of a number of same financial instruments among a plurality of different, concurrently available portfolios, the system comprising:
a computer system comprising a network interface configured to receive trading messages from an order management system;
a first database coupled to the computer and comprising first data associating each of a plurality of portfolios with a risk class and a target ratio;
a second database storing instruction to configure the computer system to:
receive from the order management systems a message descriptive of a trade of a number of same financial instruments, the message comprising a financial instrument identifier, a size of the trade, and a risk class identifier;
query the first database to determining a first plurality of portfolios that are associated with a risk class identified by the risk class identifier, wherein each of the first plurality of portfolios is different from the others of the first plurality of portfolios and is concurrently available for holding one or more of the same financial instruments;
query the first database to determine a target ratio for each of the first plurality of portfolios; and
allocate the trade of the number of the financial instruments among each of the first plurality of portfolios based on the determined target ratio for each of said portfolios.

* * * * *